US 6,708,440 B2

(12) United States Patent
Summers et al.

(10) Patent No.: US 6,708,440 B2
(45) Date of Patent: Mar. 23, 2004

(54) TURKEY DECOY

(76) Inventors: Von E. Summers, 3160 State Rte. 1668, Marion, KY (US) 42064; Raymond A. Montalta, Jr., 1467 Frances Rd., Marion, KY (US) 42064

( * ) Notice: Subject to any disclaimer, the term of this patent is extended or adjusted under 35 U.S.C. 154(b) by 0 days.

(21) Appl. No.: 10/218,814

(22) Filed: Aug. 14, 2002

(65) Prior Publication Data

US 2004/0031185 A1 Feb. 19, 2004

(51) Int. Cl.7 ............................................. A01M 31/06
(52) U.S. Cl. ........................................................ 43/2
(58) Field of Search ........................ 43/2, 3; 446/269, 446/272, 279, 280, 288, 456, 468

(56) References Cited

U.S. PATENT DOCUMENTS

| | | | | |
|---|---|---|---|---|
| 1,678,519 A | * | 7/1928 | Lynch | 446/280 |
| 3,059,368 A | | 10/1962 | Wortman | |
| 3,916,553 A | | 11/1975 | Lynch et al. | 43/3 |
| 4,965,953 A | | 10/1990 | McKinney | 43/2 |
| 5,036,614 A | | 8/1991 | Jackson | 43/2 |
| 5,168,649 A | | 12/1992 | Wright | 43/2 |
| 5,231,780 A | | 8/1993 | Gazalski | 43/3 |
| 5,233,780 A | * | 8/1993 | Overholt | 43/2 |
| 5,274,942 A | | 1/1994 | Lanius | 43/2 |
| 5,289,654 A | | 3/1994 | Denny et al. | 43/2 |
| 5,459,958 A | | 10/1995 | Reinke | 43/2 |
| 5,515,637 A | | 5/1996 | Johnson | 43/2 |
| 5,636,466 A | * | 6/1997 | Davis | 43/3 |
| 5,765,508 A | * | 6/1998 | Markowitz | 119/707 |
| 5,832,649 A | | 11/1998 | Kilgore | 43/2 |
| 5,930,936 A | | 8/1999 | Parr et al. | 43/3 |
| 6,070,356 A | | 6/2000 | Brint et al. | 43/2 |
| 6,092,322 A | | 7/2000 | Samaras | 43/2 |
| 6,212,816 B1 | * | 4/2001 | Babbitt et al. | 43/3 |
| 6,380,844 B2 | * | 4/2002 | Pelekis | 340/5.8 |
| 6,408,558 B1 | * | 6/2002 | Cornell et al. | 43/2 |
| 6,449,894 B1 | * | 9/2002 | Price et al. | 43/3 |
| 6,487,810 B1 | * | 12/2002 | Loughman | 43/2 |

OTHER PUBLICATIONS

U.S. Publication No. US 2001/0004812 A1; published on Jun. 28, 2001; inventor: G. Lindaman; title: Hunting Decoy Assemblies.

* cited by examiner

*Primary Examiner*—Charles T. Jordan
*Assistant Examiner*—Kimberly S. Smith
(74) *Attorney, Agent, or Firm*—David W. Carrithers; Carrithers Law Office

(57) ABSTRACT

A robotic frame having a multiplicity of movable frame portions supporting a flexible decoy cover or figurine and thereby providing a turkey decoy having a plurality of movable parts and mounted on a self propelled carriage that moves the decoy from one location to another.

29 Claims, 5 Drawing Sheets

TURKEY DECOY

BACKGROUND OF THE INVENTION

TECHNICAL FIELD

This invention relates generally to decoys and more particularly to a turkey decoy with a multiplicity of remotely controlled movements and to a turkey decoy that is mobile.

BACKGROUND OF THE INVENTION

The art of turkey decoys has evolved relatively recently as exemplified by the following U.S. patent application Publication No. US 2001/0004812 A1 Published Jun. 28, 2001. Furthermore, conventional turkey decoys are disclosed in the following United States Patents: U.S. Pat. No. 6,092,322 Granted Jul. 25, 2000 to Greg Samaras; U.S. Pat. No. 6,070,356 Granted Jun. 6, 2000 to George W Brint et al; U.S. Pat. No. 5,832,649 Granted Nov. 10, 1998 to Charles Kilgore; U.S. Pat. No. 5,515,637 Granted May 14, 1996 to Walter I Johnson; U.S. Pat. No. 5,274,942 Granted Jan. 4, 1994 to Charles A Lanius; U.S. Pat. No. 5,459,958 Granted Oct. 24, 1995 to Darrel H Reinke; U.S. Pat. No. 5,289,654 Granted Mar. 1, 1994 to Arthur Denny et al; U.S. Pat. No. 5,036,614 Granted Aug. 6, 1991 to Larry L Jackson; and U.S. Pat. No. 4,965,953 Granted Oct. 30, 1990 to Richard H McKinney.

The foregoing references disclose decoys with movable parts limited principally to neck movement, body tilting or raising and lowering of the body. The movement in some instances depends upon wind currents while others devices are string actuated. The above U.S. Pat. No. 5,289,654 employs servo motors that are actuated by an RF transmitter as is also done by the present applicant. The patentee however teaches moving only the head using one servo motor for raising and lowering the head and another for turning the head from one side to another. U.S. Pat. No. 5,036,614 teaches rotating the entire decoy about a vertical axis on a support peg that must be driven into the ground with such rotation being accomplished manually. None are mobile nor do any teach movement of the tail to include outward fanning, nor movement of the wings and/or back as does the present invention.

SUMMARY OF INVENTION

A principal object of the present invention is to provide a robotic frame on which a skin covering of suitable flexible material such as can be molded from plastic or fabricated from cloth can be placed and thereby provide a turkey decoy.

A further principal object of the present invention is to provide a turkey decoy having a multiplicity of movements making it more realistic and thus more likely to attract live birds for hunters.

A further principal object is to provide a robotic frame and/or turkey decoy as described in the forgoing in which the multiplicity of movements are remotely controlled by signals from an RF transmitter.

A further principal object of the present invention is to provide a mobile turkey decoy that has a multiplicity of movements that are remotely controlled.

A still further principal object of the present invention is to provide a self propelled turkey decoy that is remotely controlled and in which the decoy has a multiplicity of movements that mimic those of a live turkey.

The various movements incorporated in a decoy of the present invention include the following: head movement, wing movement, tail lift and spread, rotation of the body about a vertical axis, feeding movement, breeding movement, back expansion and mobility.

In the preferred embodiment all of the above, except rotation about a vertical axis and mobility are inter-related. It will become readily apparent hereinafter to those skilled in the art various individual movements and combinations and sub-combinations thereof maybe readily provided in a turkey decoy in accordance with the present invention.

In keeping with the foregoing, there is provided in accordance with the present invention a robotic frame for supporting a covering to provide a turkey decoy. The frame comprises a mobile carriage having means mounted thereon for traversing over the ground surface. The carriage has a post projecting upwardly therefrom with a central frame member supported on the post. A first neck supporting frame portion is mounted on the central frame portion and projects from one first end thereof. A second frame portion secured to the central frame portion and projecting from an second end thereof opposite the one first. A first pair of arms are mounted on the central frame member for supporting wing defining portions of the decoy.

In accordance with a further aspect of the present invention there is provided a robotic frame for supporting a covering to provide a turkey decoy comprising a mobile carriage having means mounted thereon for traversing over the ground surface. The carriage has at least one post projecting upwardly therefrom, and a central frame member supported on the post. A first neck supporting frame portion is mounted on the central frame portion and projects from a first end thereof. A second frame portion secured to the central frame portion projects from a second end thereof opposite the first end. A first pair of arms are mounted on the central frame member for supporting wing defining portions of the decoy and a flexible covering simulating a turkey is mounted on the frame. These features provide a mobile turkey decoy having a body, a neck with a head thereon projecting from one end of the body and a tail projecting from the other end of the body whereby the head and tail are moveable up and down in a vertical direction.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENTS

Figure 1:
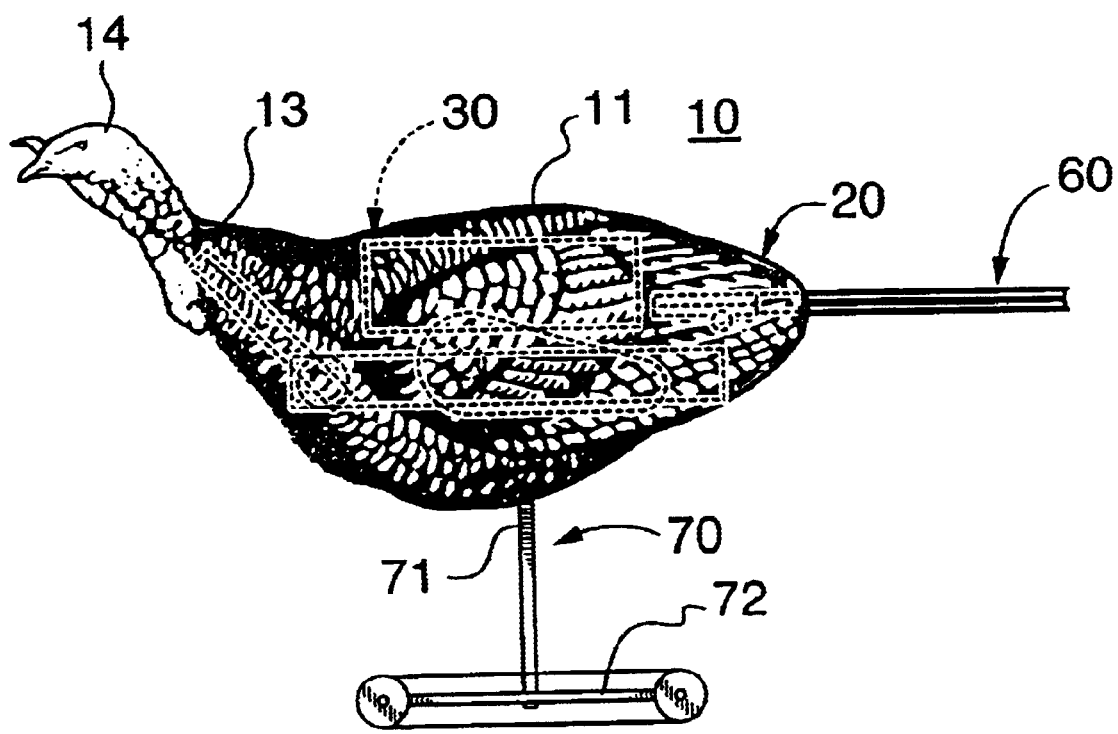
FIG. 1 is a side elevational view of a turkey decoy provided in accordance with the present invention.

Referring to the drawings there is illustrated a turkey decoy 10 comprising a flexible skin 20 mounted on a frame structure 30 that is supported on a mobile base 70. The frame structure 30 and the mobile base constitute what may be referred to as a robotic frame as it is capable of performing a multiplicity of movements including moving from one location to another that are remotely controlled. The turkey decoy 10 has a body 11 with a tail protruding outwardly from one end and a head 14 on the end of a neck 13 protruding outwardly from the opposite end of the frame.

The frame structure 30 (see FIGS. 2 and 3) has a central portion 40 defining the body of the turkey, a head and neck supporting elongate portion 50 projecting from one end of the central portion, and a tail portion 60 projecting from the opposite end and providing the tail of the decoy. The skin 20, having the appearance of a turkey, covers only the frame portions 40 and 50. The frame portion 50 is pivotally attached at one end thereof to the frame portion 40 by a pivot pin 51 for accurate movement through an arc 52 of by way of example about 35 degrees. A pulley 53 is journalled on the pivot pin and is fixedly secured to the elongate member 50 for moving the head on the outer end of the neck up and down in a vertical plane.

Figure 5:
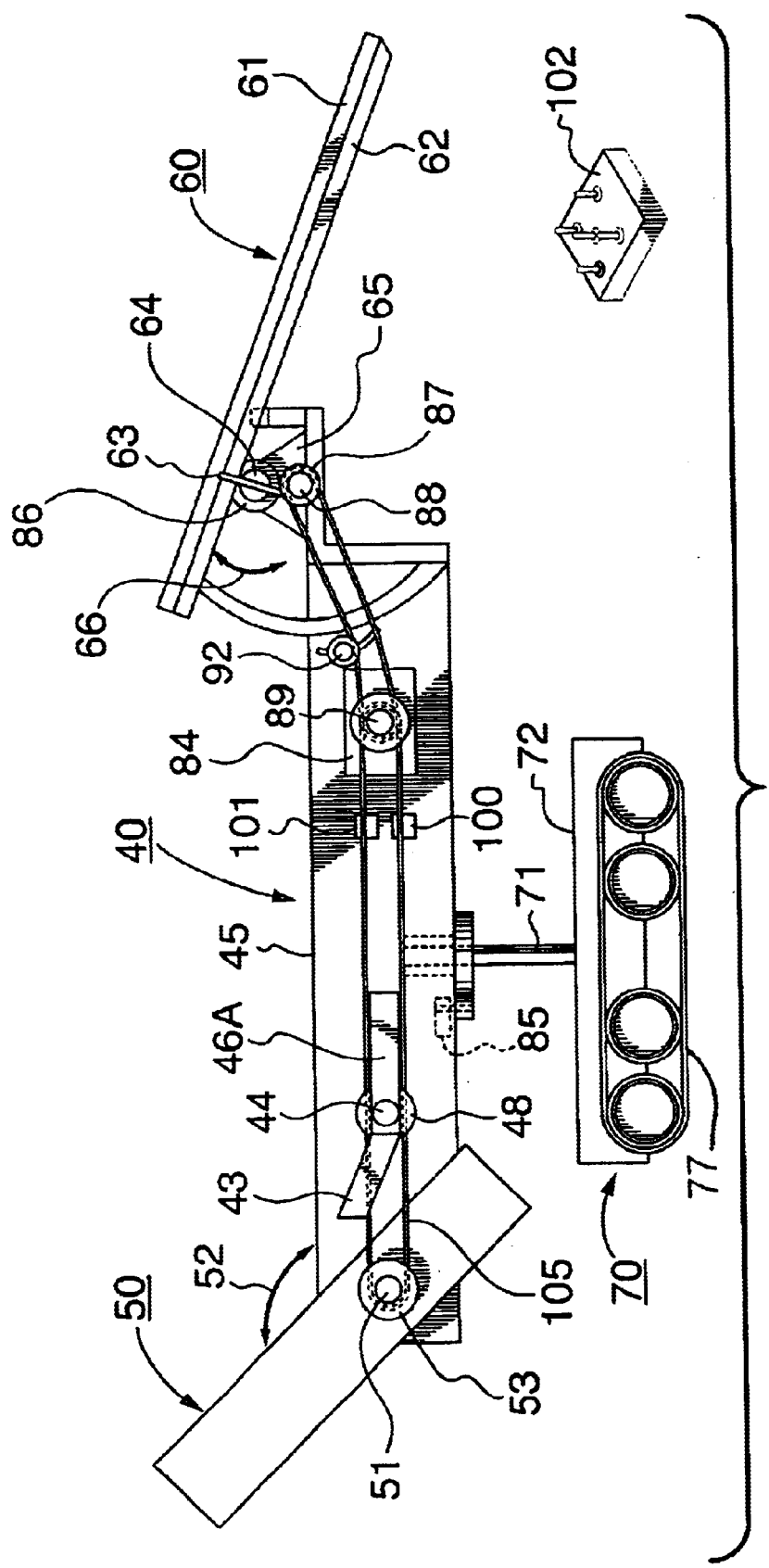
FIG. 5 is a diagrammatic side elevational view of the robotic frame and incorporating a modified mobile support carriage.

The tail defining frame portion 60 includes respective overlapping thin plate like segmental portions 61 and 62 pivotally attached by a pivot pin 63 to a shaft 64 which in turn is pivotally attached to a bracket 65 that is mounted on the frame 40. The pivot axis of the shaft 64 is horizontal thereby permitting the tail sections to pivot in unison from one to the other of a tilted upward position and a tilted downward position. The amount of movement is limited to an arc 66 (see FIG. 5) of by way of example about 120 degrees. A remotely actuated motor mounted on the frame structure causes the tail to move and control is such that the tail can assume a stationary position at any angle within the defined 120 degree arc. The pivot axis of pin 63 is vertical allowing the segmental sections to be moved relative to one another from one to the other of a first position in which the segments overlie one another and a second position where the segments, in a direction laterally of the decoy, are an extension of one another. This movement simulates moving the tail from one to the other of a normal at rest narrow position and a fanned out position.

The principal i.e. central frame 40 includes a structure 41, shown in broken line, that is of suitable nature as to support a flexible skin comprises of fabric, molded plastic, rubber, elastomer, or other flexible covering holding the same in the shape of the back of the turkey. This support structure is carried by a shaft 44 that is disposed perpendicular to and journalled on a central elongate member 45 of the frame 40. The frames 50 and 60 are pivotally attached on respective opposite ends of this elongate member 45. Wing support plates 46, 47 are attached to respective ones of first pair of arms 46A, 47A secured to opposite ends of the shaft 44. A second pair of arms 42, 43 are attached to the shaft 44 and project therefrom to engage the flexible skin covering (or support frame therefore). A pulley 48 is fixed to the shaft for oscillating the same to move the wings and at the same time the arms 46A, 47A provide movement known simulating what is known as raking.

Figure 2:
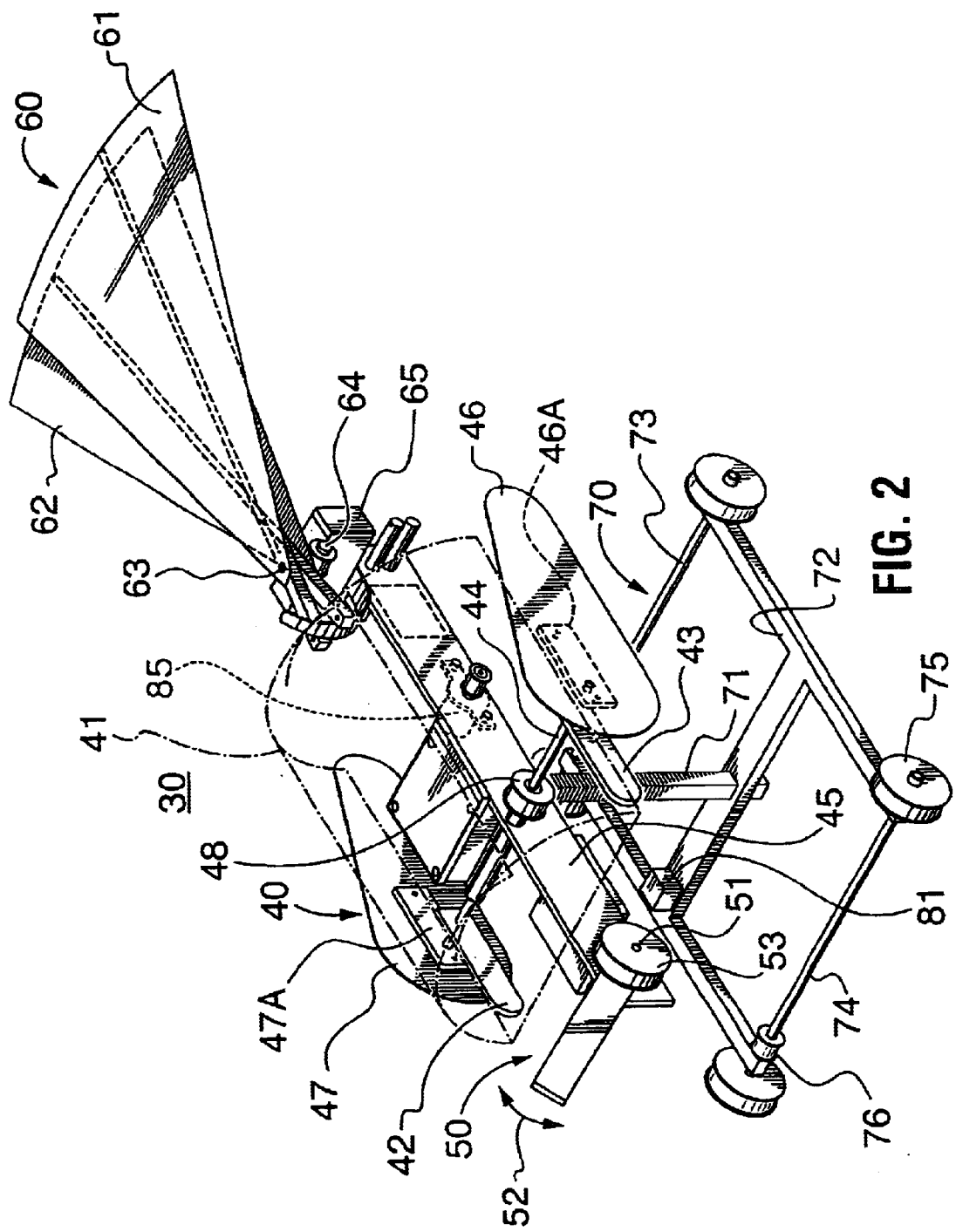
FIG. 2 is an oblique view of the robotic frame of the present invention on which a suitable molded skin covering is placed to provide a turkey decoy as shown in FIG. 1.
Figure 3:
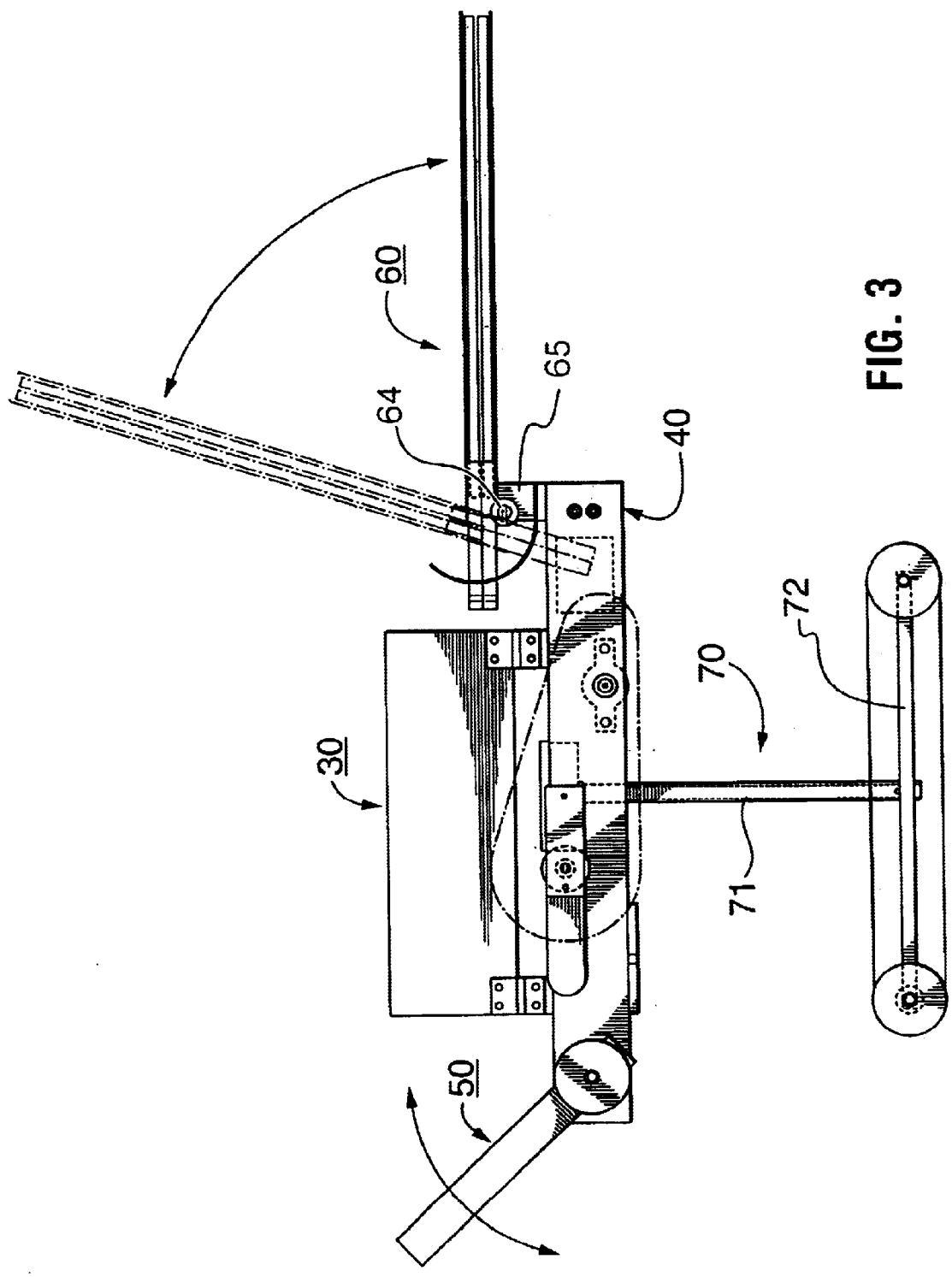
FIG. 3 is a side elevational view of the frame shown in FIG. 2.
Figure 4:
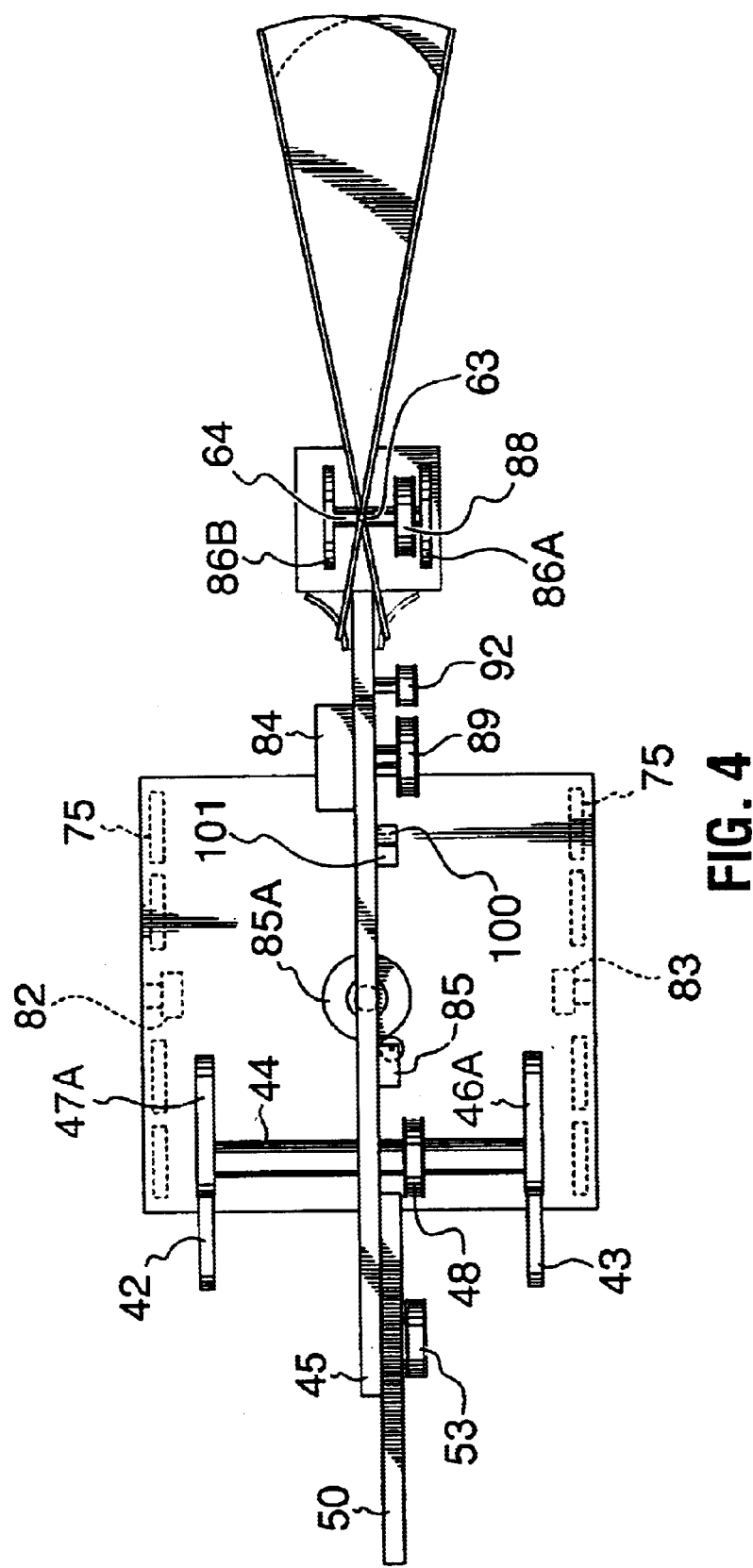
FIG. 4 is a top plan diagrammatic view of the robotic frame of FIGS. 2 and 3.

The mobile base 70 has a post 71 projecting upwardly from a frame assembly 72. The elongate frame member 45 is pivotally attached to the upper end of such post. A pair of horizontal, longitudinally spaced apart, parallel shafts 73, 74 are journalled on the frame assembly 72 and a wheel or pulley 75 is fixedly secured to each of respective opposite ends of each shaft. A drive pulley 76 is secured to at least one of the shafts, (which in the case of FIG. 2 is shaft 74), and a remotely actuated electric first servo motor 81, mounted on the frame assembly 72, is used to drive the wheels 75 associated therewith via a drive belt (or belts) not shown thereby making the decoy self propelled. The wheels maybe rubber tired, composed of plastic, or if desired the wheels on one side of the decoy maybe joined by an endless band or belt 77 with a similar endless belt joining the other pair of wheels thereby making the carriage of the decoy a crawler or track laying type of vehicle. Alternatively there maybe a plurality of wheels, as illustrated by way of example in FIG. 5, on each of opposite sides of the carriage and these wheels on the respective sides may, if desired, be mounted via what is known as walking beams to facilitate traversing rough ground surfaces. In the embodiment illustrated in FIGS. 4 and 5, the wheels on one side are driven by a motor 82 and on the other side by a motor 83. By using reversible independently controlled motors the decoy can be made to turn and thereby change direction while traveling or rotate about a vertical axis when stationary in which case the frame 30 need not be pivotally mounted on the vertical shaft 71.

Mounted on the frame member 45 are second and third servo motors 84 and 85 for respectively tilting the tail sections about the pivot axis of the shaft 64 and rotating the body of the decoy about the vertical axis of the post 71. The shaft 64 has a pair of spaced apart wheels 86A, 86B attached thereto that frictionally engage a lower face of the tail segments and/or a plates attached thereto to cause the tail to fan in and out as the shaft 64 is rotated. A pulley 88 is drivingly connected to the shaft 64. The motor 84 has a pulley 89 and via a belt drives the pulley 88. A belt tightener 92 is adjustably movably mounted on the frame member 45. The motor 85 has a gear or wheel that meshes with, or frictionally engages as the case maybe, a gear or pulley 85A secured to the post 71.

The motors are powered by a battery 100 mounted on the frame member 45 and controlled by an RF receiver 101 mounted by way of example on the frame member 45 and actuated by a remotely located hand held RF transmitter 102. An endless belt 105 loops around pulleys 53 and 88 and engages the wing tilting pulley 48 and the belt tensioner pulley 92 and the motor drive pulley 89. The motor 84 thus drives the belt moving the wings, tail sections 66, 62, and the neck and tilting of the tail in inter-related relation. As an alternative individual motors could be used to move the neck, move the wings, tilt the tail and fan out the tail in which case the RF controller maybe arranged such as to co-ordinate and inter-relate the various movements as may be desired for the decoy at hand. Also decoys maybe sold with one or more of the various movements provided as well as any combination or sub-combination of the various movements and priced accordingly with the most expensive incorporating all of the foregoing described and inter-related movements. These movements may be preprogrammed into a computer memory chip or downloaded from a disc or keyboard into a Central processing unit capable of repeating selected movements, or repeating a series of selected movements. Moreover, a speaker connected to a recording device can be utilized therewith and activated by a timer or remote unit to coordinate sounds with the movement of the decoy.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

We claim:

1. A turkey decoy, comprising:
    a flexible skin covering at least a portion of said turkey decoy;

a robotic frame for supporting said at least a portion of said turkey decoy, said robotic frame further, comprising:
1) a mobile carriage mounting to a mobile base for traversing over the ground surface;
2) at least one post having a vertical axis projecting upwardly from said mobile carriage;
3) a central frame member supported on said least one post defining a body;
4) a neck supporting frame portion mounting on said central frame member projecting from a first end thereof;
5) a tail supporting frame portion pivotally secured to said central frame member projecting from a second end thereof said tail supporting frame portion defining a tail of said turkey decoy including at least a pair of tail members moveable relative to one another for selectively varying the width of said tail of said turkey decoy;
6) a first pair of moveable arms mounted on said central frame member for supporting a pair of wing defining portions of said turkey decoy;
7) at least one remotely actuated motor for driving said mobile base;
8) a second remotely actuated motor in cooperative engagement with said tail supporting frame for moving said tail up and down and/or for moving said at least a pair of tail members relative to one another; and
(9) a third remotely actuated motor for rotating said body of said turkey decoy about the vertical axis of said at least one post; and
10) said remotely actuated motors being powered by at least one battery mounting on said mobile carriage and being controlled by an RF receiver mounted thereon in communication with a remotely located hand held RF transmitter.

2. The turkey decoy as defined in claim 1, including means pivotally mounting said central frame member on said at least one post for rotation about a vertical axis and thereby providing means to change the direction that said turkey decoy faces.

3. The turkey decoy as defined in claim 2, including remotely actuated motor means carried by said robotic frame and drivingly connected to controllably rotate said central frame member on said at least one post.

4. The turkey decoy as defined in claim 1, including at least one reversible independently controlled motor means mounted on each side of said mobile carriage, means drivingly connecting said reversible independently controlled motors to a ground traversing means thereon and means for selectively controlling said reversible independently controlled motors to cause said mobile carriage to travel over the ground surface and change the direction of travel and thereby reorient the turkey decoy to face a desired direction.

5. The turkey decoy frame as defined in claim 1, wherein said neck supporting frame portion is pivotally mounted on said central frame member.

6. The turkey decoy as defined in claim 1, wherein said first pair of moveable arms are pivotally mounted on said central frame member for movement relative thereto.

7. The turkey decoy as defined in claim 1, including a second pair of moveable arms and means for movably mounting same on said central frame member.

8. The turkey decoy as defined in claim 7, including means interconnecting said first pair of moveable arms and said second pair of moveable arms for interrelating movement therebetween.

9. The turkey decoy as defined in claim 1, including means pivotally mounting said at least a pair of tail members on said central frame member to pivot about a generally horizontal axis and change the inclination of said tail of the turkey decoy.

10. The turkey decoy as defined in claim 1, wherein said remotely actuated motor comprises a servo motor mounted on said central frame, member, wherein said neck supporting frame portion and said tail supporting frame portion and said first pair of moveable arms are movable relative to said central frame member and means drivingly connecting said servo motor to move same in coordinated interrelated relationship.

11. The turkey decoy as defined in claim 1, including a second pair of moveable arms and means moveably mounting same on said central frame member, located to engage a turkey back defining portion for moving same.

12. The turkey decoy as defined in claim 11, including means for interconnecting said first pair of moveable arms and said second pair of moveable arms to interrelate movement of same.

13. The turkey decoy as defined in claim 1, including a speaker and recording device activated by a remote unit.

14. A robotic frame for supporting a covering to provide a turkey decoy, comprising:
a flexible skin covering at least a portion of said turkey decoy;
a robotic frame for supporting said at least a portion of said turkey decoy, said robotic frame further, comprising:
a) a mobile carriage mounting to a mobile base having means mounted thereon for traversing over the ground surface;
b) at least one post having a vertical axis projecting upwardly from said mobile carriage;
c) a central frame member supported on said least one post defining a body;
d) a neck supporting frame portion mounting on said central frame member portion and projecting from a first end thereof;
e) a tail supporting frame portion pivotally secured to said central frame member projecting from a second end thereof, said tail supporting frame portion defining a tail of said turkey decoy including at least a pair of tail members moveable relative to one another for selectively varying the width of said tail of said turkey decoy;
f) a first pair of moveable arms mounted on said central frame member for supporting a pair of wing defining portions of said turkey decoy;
g) at least one servo motor for driving said mobile base;
h) a second servo motor in cooperative engagement with said tail supporting frame for moving said tail up and down and/or for moving said at least a pair of tail members relative to one another;
j) a third servo motor for rotating said body of said turkey decoy about the vertical axis of said at least one post;
k) said servo motors being powered by at least one battery mounting on said mobile carrier in electrical communication therewith; and
j) including a central processing unit electrically connecting to and communicating with said selected servo motor for selecting programming movement sequences programmable by a keypad or insertion of a removable readable memory device.

15. The turkey decoy as defined in claim 14, including means pivotally mounting said central frame member on said at least one post for rotation about the vertical axis and thereby providing means to change the direction that said turkey decoy faces.

16. The turkey decoy as defined in claim 15, including remotely actuated motor means carried by said robotic frame and drivingly connected to controllably rotate said central frame member on said at least one post.

17. The turkey decoy as defined in claim 14, including reversible independently controlled motor means mounted on each side of said mobile carriage, means drivingly connecting said reversible independently controlled motors to said ground traversing means thereon and means for selectively controlling said reversible independently controlled motors to cause said mobile carriage to travel over the ground surface and change the direction of travel and thereby reorient the turkey decoy to face a desired direction.

18. The turkey decoy as defined in claim 14, wherein said neck supporting frame portion is pivotally mounted on said central frame member.

19. The turkey decoy as defined in claim 14, wherein said first pair of moveable arms are pivotally mounted on said central frame member for movement relative thereto.

20. The turkey decoy as defined in claim 14, including a second pair of moveable arms and means for movably mounting same on said central frame member.

21. The turkey decoy as defined in claim 20, including means interconnecting said first pair of moveable arms and said second pair of moveable arms for inter relating movement therebetween of the same.

22. The turkey decoy as defined in claim 14, including means pivotally mounting a at least a pair of tail members on said central frame member to pivot about a generally horizontal axis and change the inclination of said tail of said turkey decoy.

23. The turkey decoy as defined in claim 14, wherein a remotely activated motor comprises a servo motor mounted on said central frame member, wherein said neck supporting frame portion and said tail supporting frame portion and said first pair of moveable arms are movable relative to said central frame member and means drivingly connecting said servo motor to move same in co-ordinated interrelated relationship.

24. The turkey decoy as defined in claim 14, including a second pair of moveable arms and means moveably mounting same on said central frame member, located to engage a turkey back defining portion for moving same.

25. The turkey decoy as defined in claim 24, including means for interconnecting said first pair of moveable arms and said second pair of moveable arms to interrelate movement of same.

26. The turkey decoy as defined in claim 14, including a speaker and recording device activated by a timer device.

27. A robotic frame for supporting a covering to provide a turkey decoy, comprising:

a flexible skin covering at least a portion of said turkey decoy;

a robotic frame for supporting said at least a portion of said turkey decoy, said robotic frame further, comprising:
  a) a mobile carriage mounting to a mobile base having means mounted thereon for traversing over the ground surface;
  b) means for rotatably supporting said mobile carriage having a vertical axis extending upwardly from said mobile base;
  c) a central frame member supported on said rotatable supporting means defining a body;
  d) a neck supporting frame portion mounting on said central frame member portion and projecting from a first end thereof;
  e) a tail supporting frame portion pivotally secured to said central frame member projecting from a second end thereof, said tail supporting frame portion defining a tail of said turkey decoy including at least a pair of tail members moveable relative to one another for selectively varying the width of said tail of said turkey decoy;
  f) a first pair of moveable arms mounted on said central frame member for supporting a pair of wing defining portions of said turkey decoy;
  g) at least one servo motor for driving said mobile base;
  h) a second servo motor in cooperative engagement with said tail supporting frame for moving said tail up and down and/or for moving said at least a pair of tail members relative to one another;
  j) a third servo motor for rotating said body of said turkey decoy about the vertical axis of said rotatable supporting means;
  k) said servo motors being powered by at least one battery mounting on said mobile carriage in electrical communication therewith; and
  j) including a central processing unit electrically connecting to and communicating with a selected servo motor for selecting programming movement sequences programmable by a keypad or insertion of a removable readable memory device or said servo motors being controlled by an RF receiver mounted thereon in communication with a remotely located hand held RF transmitter.

28. The turkey decoy as defined in claim 27, including a speaker and recording device activated by a timer device or remote unit.

29. The turkey decoy as defined in claim 27, wherein said means for rotatably supporting is a post.

* * * * *